Nov. 3, 1964  R. X. MEYER  3,155,850

MAGNETOHYDRODYNAMIC VOLTAGE GENERATOR

Filed Feb. 26, 1960

RUDOLF X. MEYER
INVENTOR.

BY

ATTORNEY

United States Patent Office 3,155,850
Patented Nov. 3, 1964

3,155,850
MAGNETOHYDRODYNAMIC VOLTAGE GENERATOR
Rudolf X. Meyer, Pacific Palisades, Calif., assignor to Thompson Ramo Wooldridge Inc., Canoga Park, Calif., a corporation of Ohio
Filed Feb. 26, 1960, Ser. No. 11,195
10 Claims. (Cl. 310—11)

The present invention relates in general to voltage generators and more particularly relates to apparatus using magnetohydrodynamic principles for generating direct-current voltages.

As is well known, by far the largest amount of electrical power supplied today is generated by means of apparatus involving parts moving relative to each other, namely, a rotor and a stator. Specifically, one of these elements, either the rotor or the stator, includes a large number of intricately wound coils, commonly referred to as an armature, while the other of these elements includes a number of magnetic field sources, such as electromagnets. The rotor is rotated past the stator and, due to the relative motion between these parts, magnetic fields are intercepted by the armature windings in which a strong electromotive force is thereby induced. This electromotive force is the source of the electrical power.

It will be readily obvious from the fact that existing generator apparatus involves parts moving at high speeds relative to each other that manufacturing tolerances must be stringently confined within very close limits in order to reduce vibration to a minimum. Such precautions naturally increase the cost and difficulty of manufacture of such equipment. The costs are further increased due to the fact that the armature windings are arranged in a complex manner and need to be carefully insulated from each other. Furthermore, in order to generate larger electromotive forces, proportionately larger machines must be built since a much larger number of armature windings are generally required and the dangers of very greatly increased centrifugal forces must be guarded against, thereby unduly increasing the weight-to-power ratio of the equipment. In view of the inherent limitations of such voltage generating apparatus, scientists throughout the world have been diligently striving to devise new techniques and apparatus for providing the electrical power needed to supply the myriad of uses for such power.

The present invention encompasses an entirely new approach to the generation of electrical power and would entirely eliminate or substantially reduce the limitations and difficulties encountered among conventional generators. In essence, the present invention involves the long sought technique of directly converting one form of energy, in this case heat energy, to electrical energy and this is accomplished in accordance with the basic concepts of the invention by passing a hot ionized gas, commonly known as a plasma, through a magnetic field. The ionized gas particles produce the same effect that a wire conductor would produce on being passed through the magnetic field, which is to say, that circulating electrical currents are induced in the plasma which may then be harnessed.

More specifically, according to a preferred embodiment of the invention, a suitable gas is heated to a relatively high temperature such that it becomes partially ionized, at which time the gas is propelled through a nozzle opening into a generator chamber wherein a strong magnetic field has been established. Since the nozzle aperture is relatively small as compared to the combustion and generator chambers, the ionized gas or plasma is injected into the magnetic field at very high velocities, with the result that very substantial currents are caused to flow through the plasma in a particular direction. Electrodes are suitably positioned in such a manner inside the generator chamber that the induced currents flow between these electrodes, thereby making it possible to supply this electrical power for external usage.

It will be recognized that as a result of the high velocity of the gas, which can be much higher than the peripheral velocity of conventional voltage generating equipment, the apparatus of the present invention promises to achieve an unusually low weight-to-power ratio and may, therefore, find application as generator equipment for electric propulsion, such as propulsion by plasma-jet devices. Furthermore, it will also be recognized that since apparatus constructed in accordance with the present invention does not include any moving parts, such apparatus may, therefore, be built with less difficulty and with less finesse, thereby eliminating many of the cost factors expected with conventional equipment. Moreover, the avoidance of rotating parts means that no precautionary measures need be taken against centrifugal forces, with the result that the size of such apparatus as well as the weight-to-power ratio may be further decreased. Still other advantages of the present invention over earlier forms of electrical power generating equipment will be obvious to those who are skilled in this or related arts.

It is, therefore, an object of the present invention to provide an improved form of power generating equipment in which heat energy is converted directly to electrical energy.

It is another object of the present invention to provide a voltage generator that operates in accordance with magnetohydrodynamic principles.

It is a further object of the present invention to provide for the direct conversion of heat energy to electrical energy by passing a hot ionized gas through a magnetic field.

It is an additional object of the present invention to provide electrical power generating apparatus which does not require the use of moving parts.

The novel features which are believed to be characteristic of the invention, both as to its organization and method of operation, together with further objects and advantages thereof, will be better understood from the following description considered in connection with the accompanying drawing in which two embodiments of the invention are illustrated by way of example. It is to be expressly understood, however, that the drawing is for the purpose of illustration and description only and is not intended as a definition of the limits of the invention.

Figure 1:
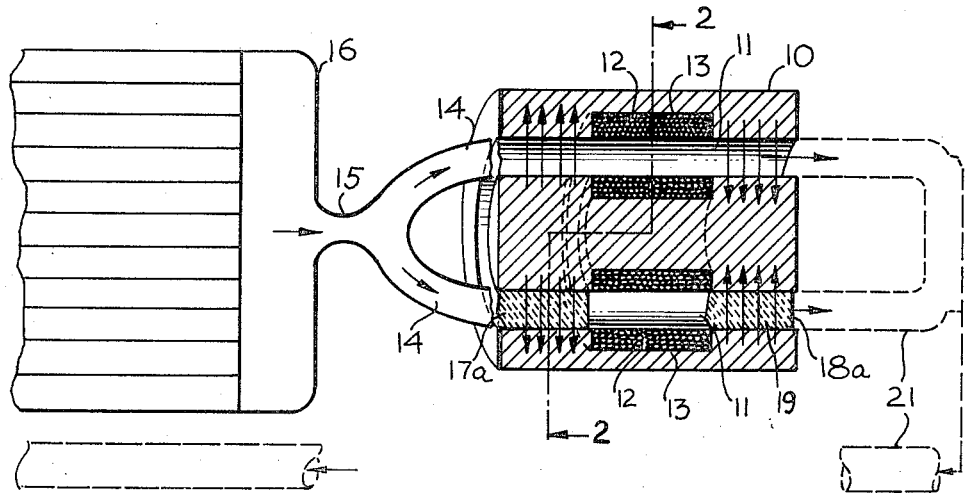
FIGURE 1 is a cross-sectional view of apparatus according to the present invention and illustrates the basic construction and operation of such apparatus.
Figure 2:
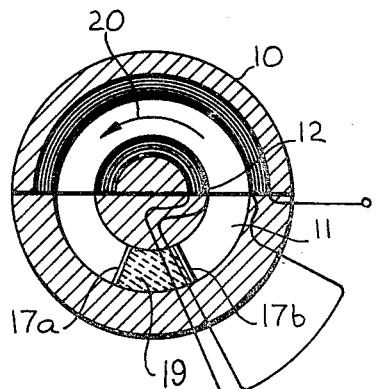
FIGURE 2 is a cross-sectional view of the apparatus shown in FIGURE 1 taken along the lines 2—2.

Considering now the drawing, reference is made to both FIGURE 1 and FIGURE 2 wherein the embodiment is shown to include an iron core 10 which has an annular passageway 11 extending longitudinally through the core for its full length. Intermediate the ends of core 10, preferably along the central portion thereof, a plurality of electrically conductive windings are mounted on the core in a recess provided for them, the windings being designated 12 and the recess in which they are mounted being designated 13. The windings 12 may be suitably insulated from each other by any high temperature material such as a ceramic or the like. As may be seen from the drawing, the windings are disposed in the core circumferentially on both sides of passageway 11 so that it may be said that the longitudinally central portion of the annular passageway is surrounded on each radial side thereof by the windings which may be connected to each other either in series or in parallel. The arrangements shown in FIGURE 2 places the inner and outer coil windings in series relationship.

Annular passageway 11 is coextensive with and connected to one end of a tubular passageway 14 which smoothly couples annular passageway 11 to a nozzle 15 constituting the outlet from a heating and ionization chamber 16. The heating and ionization chamber may be of a type that is well known and hence need not be described in minute detail here. For example, a fission reactor may be adapted for use herein.

Referring again to iron core 10 and annular passageway 11 therein, electrodes are mounted in said passageway, preferably along radial planes, that is, along planes that are perpendicular to the sides of passageway 11. Two pairs of electrodes, designated 17a, 17b and 18a, 18b, are preferred, as shown in FIGS. 1 and 2, but other numbers of electrodes may be used as well. Electrodes 17a and 18a are insulated from electrodes 17b and 18b, respectively, and they are shown to extend from the ends of the core or passageway to the ends of the electromagnet which is outlined by the recess 13.

Considering the type of gases or other materials that may be used to provide the hot plasma, it is preferred that substances of relatively small molecular weight be used because of their greater heat transfer qualities. Helium is an example of the type of gas that is preferred as a plasma source. Furthermore, due to the fact that only a portion of the gas injected into heating and ionization chamber 16 may eventually become ionized and, since it is obviously desirable to obtain the highest possible degree of ionization, it is recommended that one or more alkali substances be mixed with helium in chamber 16 to increase the extent of the ionization. Alakalis, such as cesium, sodium, potassium, etc., are preferred over other substances which may also be used because alkalis are noted for their relatively small ionization potential, which means that they readily become ionized.

As for the main body structure of the apparatus, electrodes 17 and 18 may be made of copper although other materials may be used as well, such as graphite. As shown in FIGURE 2, the electrodes are spaced from each other, the space between them being filled with a heat-resistant electrically insulative material 19, such as ceramic or possibly mica. With respect to an annular gap defined by a longitudinally central portion of the passageway 11 in which the electrodes are positioned, the width of this passageway may be varied over a range of values but, in view of the fact that it is desired to propel the plasma through the passageway at supersonic speeds and in view of the further fact that the larger the gap the more difficult it is to provide a strong magnetic field, it is preferred that the width of the gap be confined to within one to two inches. Moreover, to obtain the supersonic speeds mentioned above, it is desirable to maintain at least a 5:1 gas pressure ratio between nozzle 15 and the ambient at the output end of passageway 11.

Considering now the operation, an electrical current is caused to flow through windings 12, the current in all windings flowing in the same direction around the core. Consequently, a magnetic field is generated in such a manner that the magnetic flux lines of this field cross the gap defined by the passageway 11 perpendicularly to the surfaces thereof, that is, the magnetic flux lines are radial with respect to an axis of the core 10. The plasma, which has been heated and ionized in chamber 16, is propelled through nozzle 15 and into passageway 14 at supersonic speeds, with the result that the plasma rushes through passageway 11 at these speeds perpendicularly to the magnetic field therein. The ionized gas that fills annular passageway 11 acts like a continuous stream of circular conductors intercepting the magnetic field, with the result that an induced current flows circularly around the passageway between electrodes 17a, 17b and 18a, 18b. The current and its possible direction of flow are indicated in FIGURE 2 by means of arrow 20. It will be recognized by anyone skilled in the art that by connecting an external load between electrodes 17 and 18, the current would exit at one electrode, such as electrode 17a, flow through the load and toward electrode 18a to complete a circuit. In view of the fact that the magnetic field and the plasma flow are substantially constant, the electro-motive forces induced in the plasa between the electrodes are also substantially constant so that the apparatus described above is essentially a direct-current voltage generator.

It was mentioned earlier that gases of relatively light molecular weight were preferred, such as helium. Since the cost of helium is considered high, it is certainly desirable that the same gas be used continuously, that is, re-circulated and used for an extended period of time. In other words, for the purpose of reducing costs, it is most desirable that the apparatus shown and described thus far be a closed system wherein the gas emitted from passageway 11 be re-circulated through ducts 21, only partially shown in FIG. 1. For example, the gas passes through a heat exchanger (not shown) where heat is rejected by means of a coolant or by means of a second thermodynamic cycle. The gas then passes through a compressor (not shown) and back into the heating and ionization chamber. The heat exchanger and compressor apparatus are not shown because they are well known in the art. The various techniques by which a closed system may be devised are all well known in the art, that is, they are commonplace techniques and hence it is not deemed necessary to described them here in detail.

One way in which the gas might be partially ionized has already been mentioned. Other ways in which the gas in the annular passageway may be partially ionized are available. Thus, for example, due to the motion of the gas through the magnetic field, an electric field is induced with respect to a coordinate system moving with the gas. This electric field may be large enough to result in electrical breakdown of the gas, thereby greatly enhancing its effective conductivtiy. For instance, for a velocity of the gas of 8000 meters per second (corresponding to a Mach number of three in helium at 2000° K.), a magnetic field of 200 Gauss in the gap and a circumferential length of the annular passageway of one meter, the corresponding potential difference which would be induced by the motion of the gas is 1600 volts. This is sufficient to cause breakdown at low gas pressures or, alternatively, to maintain this condition after a portion of the gas has been broken down initially by some other means, such as by the application of a high-voltage pulse. Moreover, a number of different ways may be combined to produce an enhanced effect, as by first heating the gas to a state of partial ionization and then increasing the ionization in the manner just described.

Figure 3:
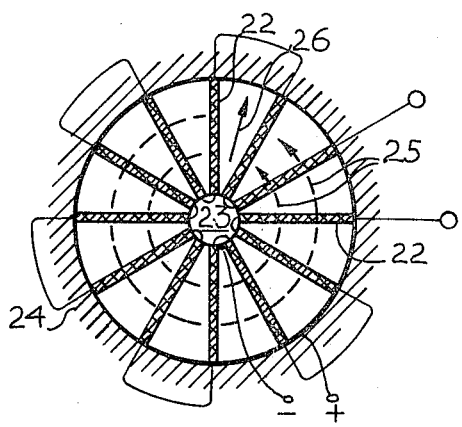
FIGURE 3 is a cross-sectional view similar to the cross-sectional view of FIGURE 2 illustrating another embodiment of the present invention.

Another embodiment utilizing the principles of the present invention is shown in FIGURE 3 wherein a magnetic field is produced by windings imbedded inside a plurality of radial ribs 22 spanning the annular passageway. In this embodiment, the electrodes, designated 23 and 24, are of cylindrical shape with radial ribs 22 extending between them. In all other respects the embodiment of FIGURE 3 is substantially identical with that shown in FIGURES 1 and 2 with the coils contained within the radial ribs 22 being shown as connected in series with each other, it being obvious that the coils may also be connected in parallel.

With respect to the operation of this second embodiment, the flow of current in the windings imbedded in the radial ribs generates a magnetic field whose flux lines are circular, that is to say, concentric with the electrodes, as illustrated by arrows 25. It can be easily shown, therefore, that the current flow induced in the plasma is radial rather than circumferential as before, the direction of current flow in the FIGURE 3 embodiment being illustrated by arrow 26. Current is drawn by the two cylindrical surfaces which define the annular passage and which also serve as electrodes 23 and 24.

Although particular arrangements of the invention have been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A voltage generator comprising: apparatus having a passageway therethrough, said apparatus including means for generating a magnetic field in said passageway; at least one pair of electrodes mounted in and disposed substantially perpendicular to walls defining the longitudinal direction of said passageway; and means for thrusting an ionized gas through said passageway at high speeds, the interception of said field by said ionized gas particles causing an electrical current to flow between said electrodes.

2. A voltage generator comprising: a permeable core apparatus having an annular passageway extending longitudinally therethrough, said apparatus including means for generating a magnetic field in said passageway; at least one pair of electrodes mounted in and disposed substantially perpendicular to walls defining the longitudinal direction of said passageway; and means for thrusting an ionized gas through said passageway at high speeds, the interception of said field by said ionized gas particles causing an electrical current to flow between said electrodes.

3. A voltage generator comprising: a permeable core apparatus having an annular passageway extending longitudinally therethrough, said apparatus including means for generating a magnetic field in said passageway; at least one pair of spaced electrodes mounted in said annular passageway substantially perpendicular to walls defining the longitudinal direction thereof; and means coupled to said annular passageway through a narrow nozzle for thrusting an ionized gas through said passageway at high speeds, the interception of said field by said ionized gas particles causing an electrical current to flow between said electrodes.

4. A voltage generator comprising: an iron core having an annular air gap extending longitudinally therethrough, said core including means for generating a substantially radial magnetic field across said air gap; at least one pair of spaced electrodes mounted substantially radially in said air gap; and means coupled to said annular air gap for thrusting an ionized gas through said air gap at high speeds, the interception of said field by said ionized gas particles causing an electrical current to flow between said electrodes.

5. A voltage generator comprising: an iron core having an annular air gap extending longitudinally therethrough, said iron core having at least one annular recess along the air gap intermediate the ends thereof; an electric winding wound on said core in each recess, said winding and core being operable in response to current flow through said winding to generate a radial magnetic field in said air gap; at least one pair of spaced electrodes mounted substantially radially in said air gap; and means coupled to said annular air gap for thrusting an ionized gas through said air gap at high speeds, the interception of said field by said ionized gas particles causing an electrical current to flow between said electrodes.

6. In a voltage generator wherein the heat energy of a plasma is directly converted to electrical energy, apparatus comprising: an iron core having an annular air gap extending longitudinally therethrough, said iron core having at least one annular recess along the air gap intermediate the ends thereof; an electric winding wound in such a manner on said core in each recess that said winding and core are operable in response to current flow through said winding to generate a radial magnetic field in said air gap; and at least one pair of spaced electrodes mounted substantially radially in said air gap.

7. A voltage generator comprising: an iron core having an annular air gap extending longitudinally therethrough, said air gap dividing said iron core into concentric inner and outer electrode portions; source means mounted in said air gap for generating a circular magnetic field whose flux lines are substantially concentric with said core portions; and means coupled to said annular air gap for thrusting an ionized gas therethrough at high speeds, the interception of said field by said ionized gas particles causing an electrical current to flow substantially radially between said electrode portions.

8. The voltage generator defined in claim 7 wherein said source means includes a plurality of radially oriented rib members mounted around said air gap between said inner and outer core portions and a plurality of electrical windings respectively imbedded inside said ribs in the planes thereof.

9. In a voltage generator wherein the heat energy of a plasma is converted directly into electrical energy by passing the plasma through a magnetic field at high speeds, apparatus comprising: an iron core structure having an annular air gap extending longitudinally therethrough, said air gap dividing said iron core into concentric inner and outer electrode portions; a plurality of radially oriented rib members mounted around said air gap between said inner and outer core portions; and a plurality of electrical windings respectively imbedded inside said ribs in the planes thereof, said windings being operable in response to the flow of current therethrough to generate a magentic field in said air gap whose flux lines are substantially concentric with said core portions.

10. A voltage generator wherein the heat energy of a plasma is converted directly into electrical energy by, passing the plasma through a magnetic field at high speeds, said generator comprising: an iron core structure having an annular air gap extending longitudinally therethrough, said structure including electrodes disposed substantially perpendicular to walls defining the longitudinal extension of said annular air gap; and electrical windings mounted on said core structure and about said air gap, said windings being operable in response to current flow therethrough to generate a magnetic field whose flux lines are substantially perpendicular to the direction of plasma flow.

References Cited in the file of this patent

UNITED STATES PATENTS

| 1,196,511 | Borger | Aug. 29, 1916 |
| 1,443,091 | Petersen | Jan. 23, 1923 |
| 1,717,413 | Rudenberg | June 18, 1929 |
| 2,210,918 | Karlovitz | Aug. 13, 1940 |

FOREIGN PATENTS

| 648,937 | Germany | Aug. 11, 1937 |
| 841,613 | Germany | June 16, 1952 |
| 738,511 | Great Britain | Oct. 12, 1955 |
| 1,161,079 | France | Mar. 17, 1958 |